(12) United States Patent  (10) Patent No.: US 7,446,919 B2
Wood  (45) Date of Patent: Nov. 4, 2008

(54) PIEZOELECTRIC ACTUATED SCANNING MIRROR

(75) Inventor: Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/837,037

(22) Filed: Apr. 30, 2004

(65) Prior Publication Data

US 2005/0243446 A1   Nov. 3, 2005

(51) Int. Cl.
G02B 26/08 (2006.01)
(52) U.S. Cl. .......................... 359/224; 359/198
(58) Field of Classification Search ................ 359/213, 359/214, 223, 224, 225, 198, 199
See application file for complete search history.

(56) References Cited

U.S. PATENT DOCUMENTS

| 5,029,975 | A | 7/1991 | Pease ........................ 350/96.27 |
| 5,208,880 | A | 5/1993 | Riza et al. |
| 5,311,321 | A | 5/1994 | Crowley ..................... 348/760 |
| 5,614,961 | A | 3/1997 | Gibeau et al. ................ 348/750 |
| 5,715,021 | A | 2/1998 | Gibeau et al. ................ 348/750 |
| 5,915,063 | A | 6/1999 | Colbourne et al. |
| 5,920,361 | A | 7/1999 | Gibeau et al. ................ 348/750 |
| 6,018,408 | A | 1/2000 | Hong .......................... 359/201 |
| 6,140,979 | A | 10/2000 | Gerhard et al. .................. 345/7 |
| 6,198,565 | B1 * | 3/2001 | Iseki et al. .................... 359/224 |
| 6,201,629 | B1 * | 3/2001 | McClelland et al. ........ 359/223 |
| 6,304,237 | B1 | 10/2001 | Karakawa .................... 345/84 |
| 6,489,934 | B1 | 12/2002 | Klausner .................... 345/1.1 |
| 6,687,034 | B2 * | 2/2004 | Wine et al. .................. 359/198 |
| 6,710,680 | B2 * | 3/2004 | Niu et al. .................... 333/186 |
| 7,031,041 | B2 * | 4/2006 | Mi et al. ..................... 359/224 |
| 2001/0050801 | A1 | 12/2001 | Behin et al. |
| 2002/0024495 | A1 | 2/2002 | Lippert et al. ................. 345/98 |
| 2002/0024708 | A1 | 2/2002 | Lewis et al. ................ 359/197 |

FOREIGN PATENT DOCUMENTS

WO   WO 03/005733 A1   1/2003
WO   WO 2004/064410 A1   7/2004

* cited by examiner

*Primary Examiner*—Alessandro Amari
(74) *Attorney, Agent, or Firm*—Kirschstein, et al.

(57) ABSTRACT

A scanning mirror useful in laser projection devices (LPDs) is provided. The scanning mirror is comprised of a substantially planar member having a movable reflective region and a base region coupled together by a split hinge. A foundation is coupled to the base region by at least one piezoelectric element extending therebetween such that movement the piezoelectric element is transferred to the movable reflective region through the split hinge.

7 Claims, 7 Drawing Sheets

PIEZOELECTRIC ACTUATED SCANNING MIRROR

BACKGROUND OF THE INVENTION

1. Field of the Invention

This invention relates generally to a laser projection device (LPD), and, more particularly, to an LPD that employs a scanning mirror that may be actuated by a piezoelectric device.

2. Description of the Related Art

In the field of LPDs, one or more mirrors may be used to redirect and/or scan one or more beams of laser light onto a projection surface. These mirrors must be capable of rapid, highly-controlled movement in order to accurately position the laser beams on the projection surface. As the mirror moves to scan the laser beams, horizontally and/or vertically, any inaccuracy in the positioning of the mirror will result in the laser beams being inaccurately positioned on the projections surface. Thus, any image projected by the LPD will be distorted. In some instances, the distance between the projection surface and the mirror may be substantial, such that even relatively minor inaccuracies in the positioning of the mirror may produce dramatic mispositioned laser beams on the projection surface.

The present invention is directed to overcoming, or at least reducing, one or more of the problems set forth above.

SUMMARY OF THE INVENTION

In one aspect of the present invention, an apparatus is provided. The apparatus comprises a movable reflective region, a base region coupled to the movable reflective region by a split hinge, a foundation and at least one piezoelectric element extending between the foundation and the base region such that movement the piezoelectric element is transferred to the movable reflective region through the split hinge.

BRIEF DESCRIPTION OF THE DRAWINGS

The invention may be understood by reference to the following description taken in conjunction with the accompanying drawings, in which like reference numerals identify like elements, and in which.

Figure 1:
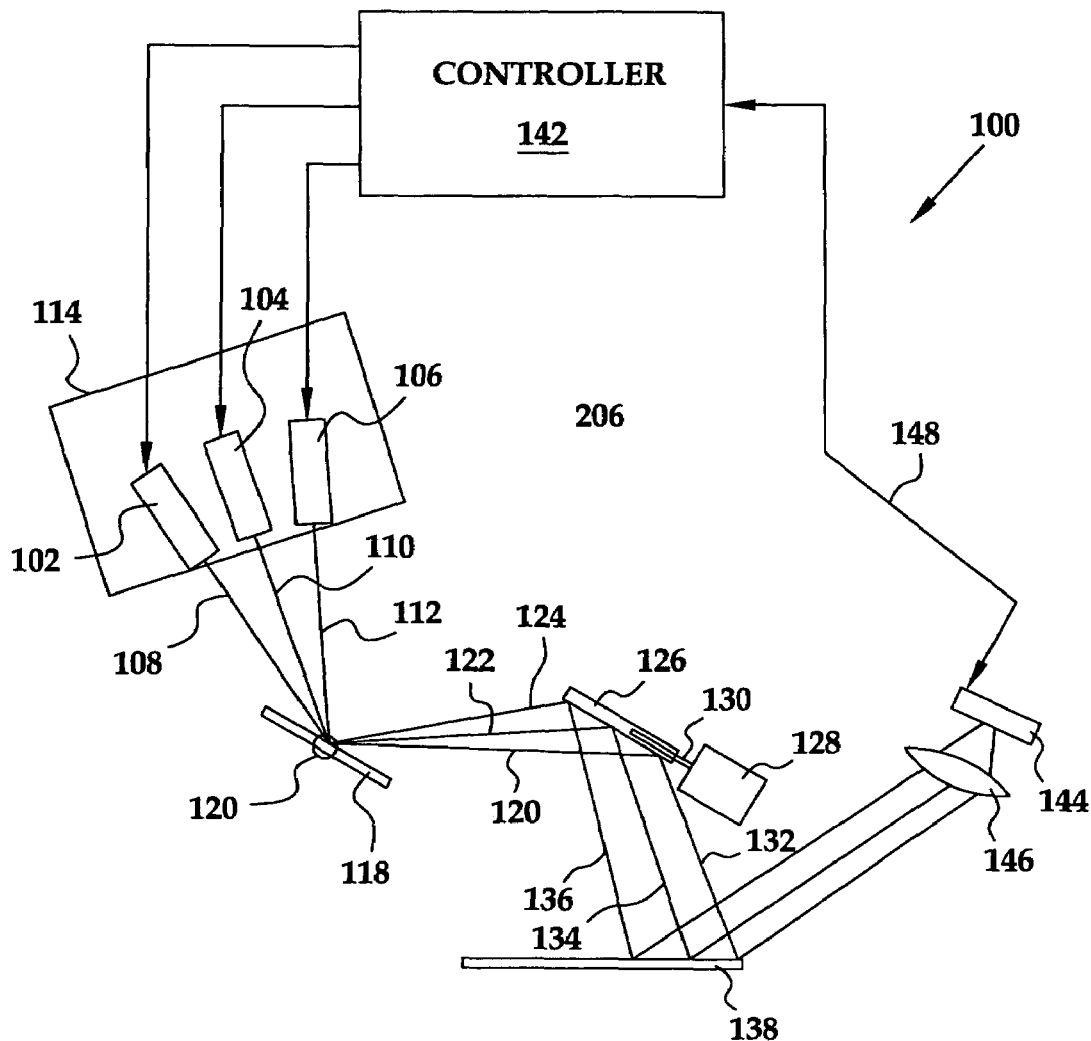
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relatively to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., 20-30 kHZ). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface may take on any of a variety of forms without departing from the spirit and scope of the instant invention.

Figure 2:
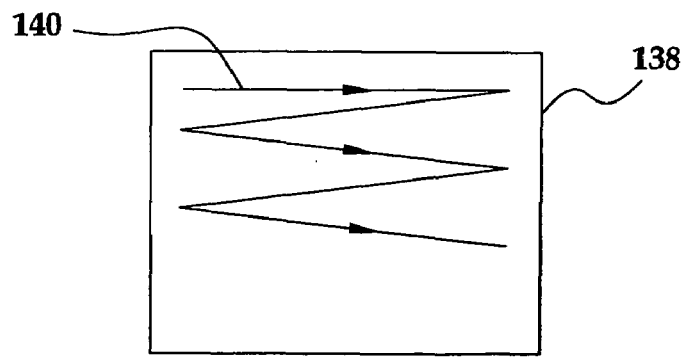
FIG. 2 is a stylistic view of a viewing surface shown in FIG. 1.

The second mirror oscillates or rotates at a relatively slow rate, as compared to the rate of the first mirror 118 (e.g., 60 hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
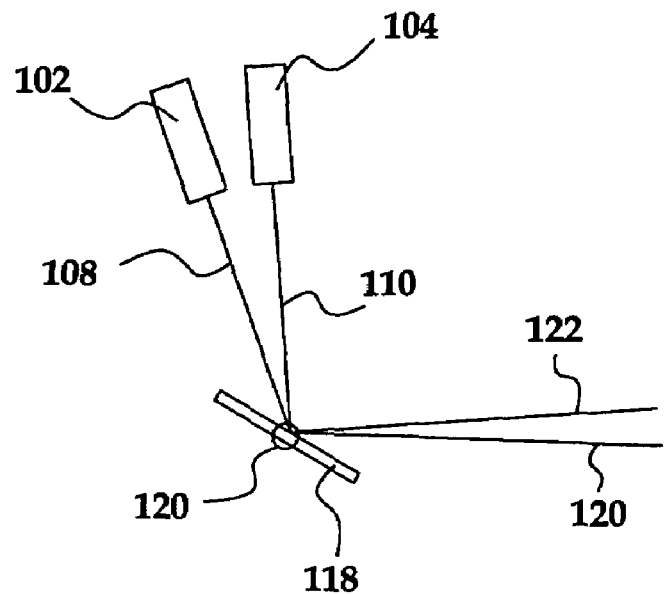
FIGS. 3A and 3B depict a top view of a scanning device at various times during its operation.
Figure 3B:
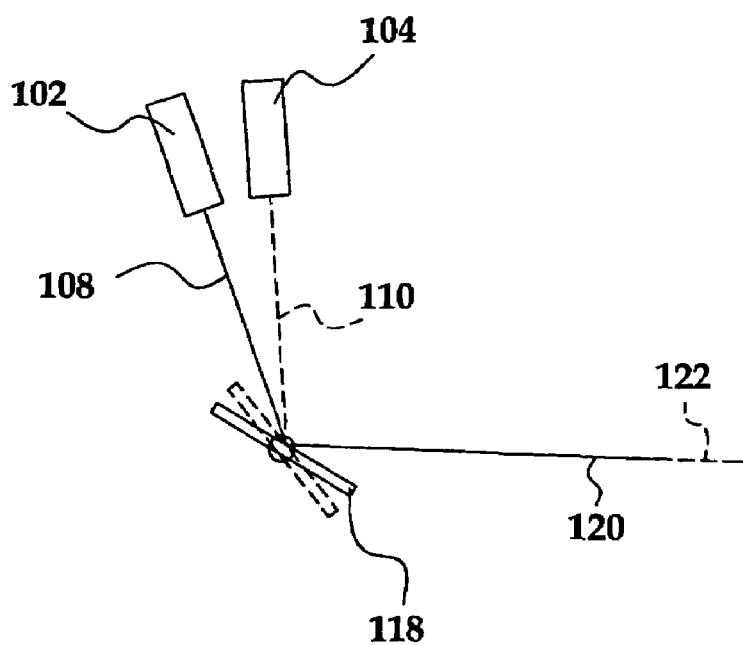

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Figure 4:
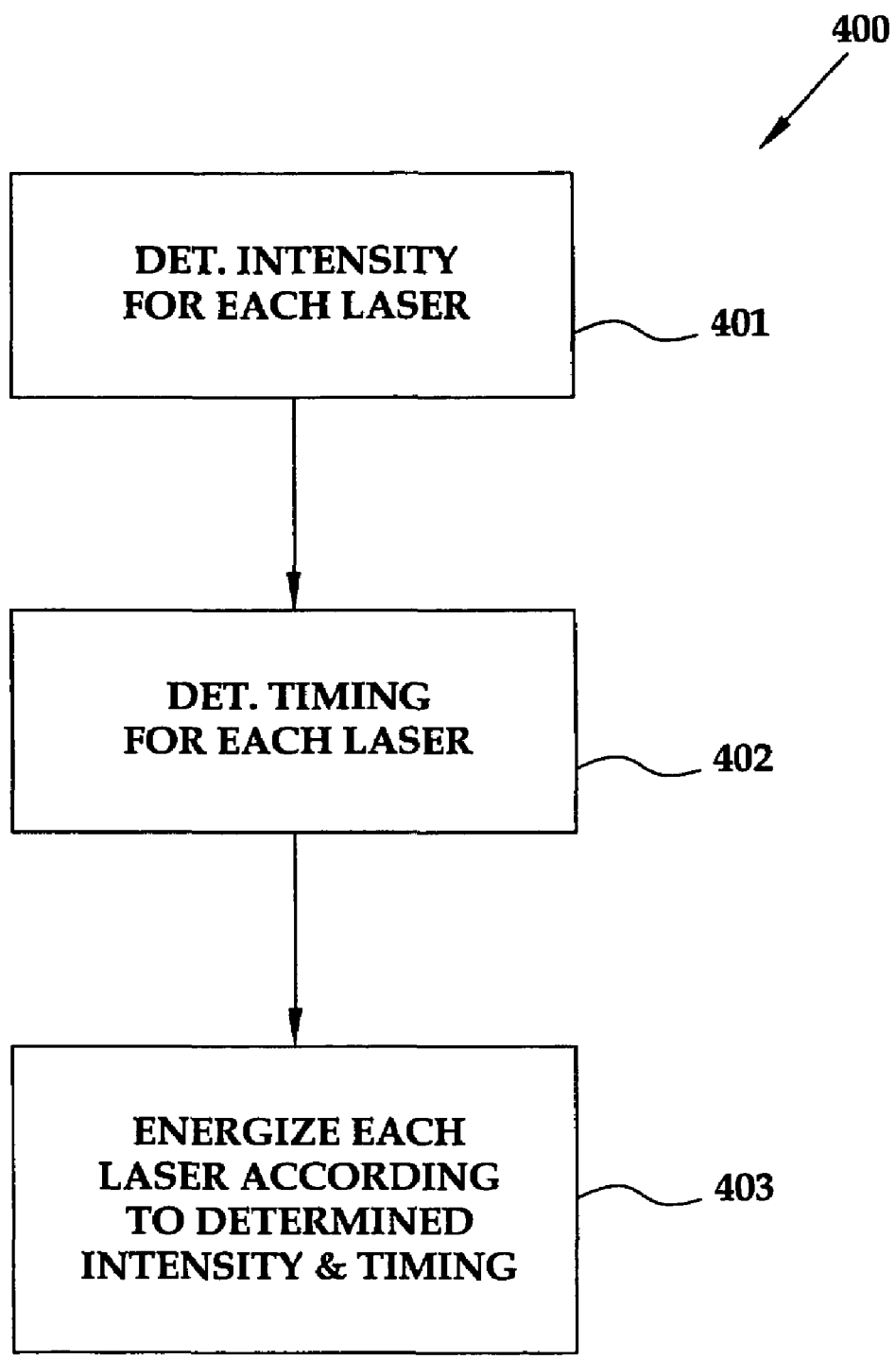
FIG. 4 depicts one embodiment of a flow chart of a control program that may executed by a controller shown in FIG. 1.

Turning now to FIG. 4, one embodiment of a control routine 400 that may be used in the controller 142 is illustrated. The routine begins at block 401 with the controller 142 determining the intensity for each of the lasers. That is, in order for a picture to be properly displayed, the controller 142 is capable of determining the hue of the picture at that small portion of the picture that is about to be projected onto the viewing surface. To reproduce the proper hue, the controller 142 determines the intensity for each of the lasers. This determination may be accomplished in any of a variety of conventional manners, such as via a look-up table, via a mathematical algorithm or the like.

In block 402, the controller 142 determines the time at which each of the lasers is to be energized. The determination of the timing may be accomplished in any of a variety of conventional manners, such as via a look-up table, via a mathematical algorithm or the like. This technique can be used during a calibration after manufacture. Ordinarily, this timing may be relatively fixed. That is, the timing may be established at the end of the manufacturing process by a factory technician, and thereafter, the controller may simply use these factory determined settings.

It may be useful, however, to allow a technician or even a consumer to periodically make adjustments to the timing to account for mechanical changes in the system 100 that arise from environmental conditions, such as temperature or harsh treatment. Since the timing variations may be accomplished by storing the timing requirements in non-volatile memory, a routine may be established to allow these settings to be altered as needed. That is a software routine may be included to project preselected tuning patterns (such as a cross pattern for each color laser) on the viewing surface. A service technician or consumer may then indicate to the controller (by depressing a preselected sequence of buttons) that the tuning patterns need to be adjusted to cause them to overlap properly. The controller 142 may then use the technician or consumer supplied information to alter the timing of the lasers.

Finally, in block 403, the controller 142 uses the determined timing and intensity for each of the lasers and controllably energizes the lasers to produce the desired hue at the present location on the viewing surface. The control routine 400 is continuously repeated for numerous points along the path 140 to effectively reproduce a picture on the viewing surface.

Figure 5:
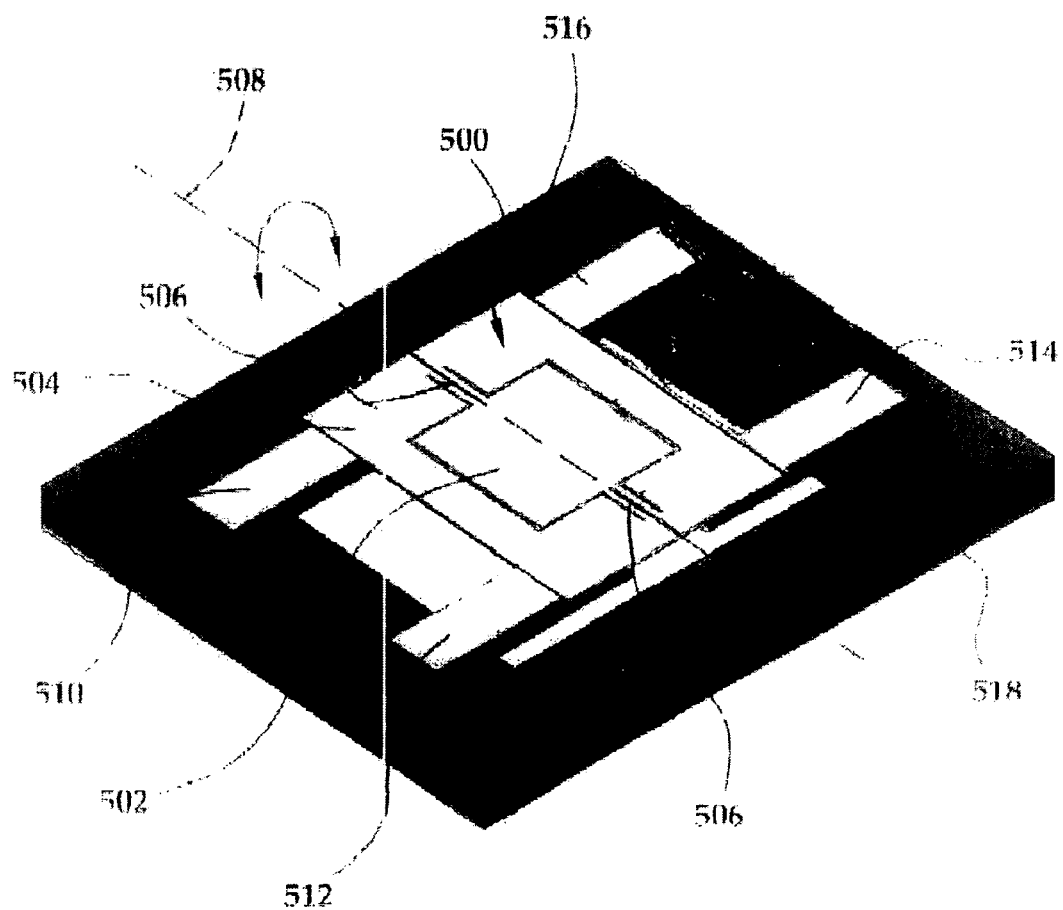
FIG. 5 depicts a stylistic perspective view of one embodiment of a mirror shown in FIG. 1.

Turning now to FIG. 5, one embodiment of a mirror that may be employed as the scanning mirrors 118, 126 is shown. In the illustrated embodiment, a non-resonant scanning mirror 500 is activated using piezoelectric elements 502, 504. A characteristic stroke limitation of piezoelectric elements is overcome by applying a force developed by a piezoelectric element at a point very close to the axis of rotation of the mirror 500. Hence, relatively large scan angles can be achieved without relying on high mechanical Q factor.

The mirror 500 may be formed from a substantially planar sheet of material 500, such as metals, ceramics, semiconductors or the like. Slots or grooves extending substantially through the sheet of material divide the sheet of material into two basic regions, a movable reflective region 502 and a base region 504, which in the illustrated embodiment substantially surrounds the movable reflective region 502. The movable reflective region 502 remains coupled to the base region 504 by a pair of split torsion hinges 506. The split torsion hinges 506 are formed by slots or grooves that extend substantially through the sheet of material and are substantially aligned with an axis of rotation 508 of the movable reflective surface 502.

The movable reflective surface 502, also referred to herein as a scan element, is generally free to rotate about the axis 508 so that laser light directed onto the movable reflective surface 502 may be reflected therefrom at various angles. Controllable positioning of the movable reflective surface 502 is accomplished by a set of piezoelectric elements 510, 512, 514, 516, also known as a drive. Generally, the piezoelectric elements 510, 512, 514, 516 extend between the base region 504 and a foundation, such as a printed circuit (PC) board 518. Those skilled in the art will appreciate that while the illustrated embodiment of the instant invention utilizes four piezoelectric elements, a smaller or greater number of elements may be employed, depending on the design criteria of the application in which the mirror is being used, without departing from the spirit and scope of the instant invention. The base region 504 is also referred to herein as a movable support having support portions at opposite sides of the axis 508.

The split hinges 506 provide a restoring force, which aids in returning the movable reflective region 502 to its initial unbiased position. Each hinge 506 also acts as a link, transmitting the force from the piezoelectric elements 510, 512, 514, 516 to the mirror 500. Since the forces are applied off-center, they generate torque, which forces the movable reflective region to rotate.

The embodiment illustrated in FIG. 5 is especially efficient when the mirror 500 is constructed using Micro-Electro-Mechanical Systems (MEMS) technology, so the split hinges 506 can be very narrow and the distance between the slots forming the hinges 506 may be very short.

Figure 6A:
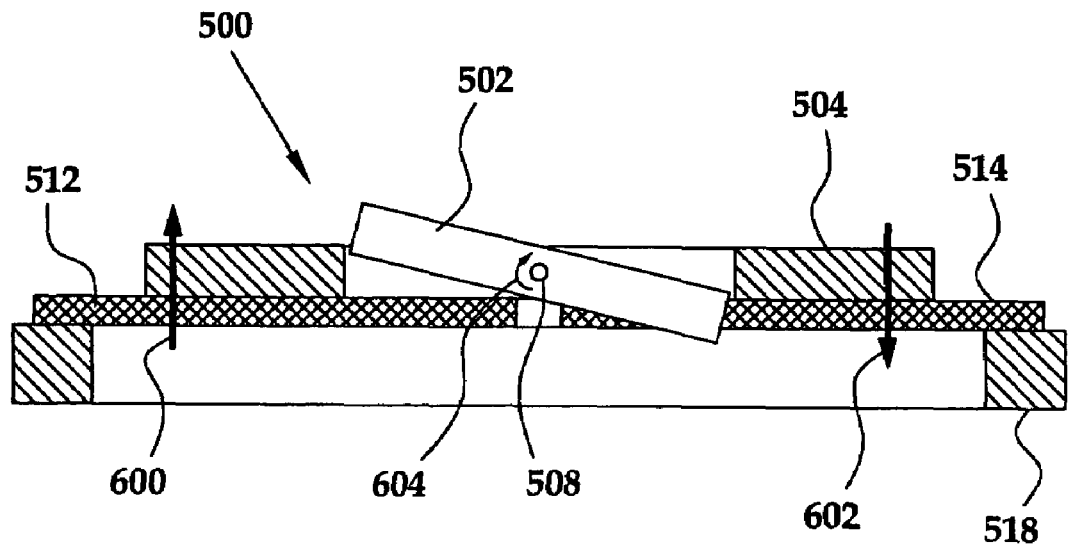
FIGS. 6A and 6B depict an end view of the mirror of FIG. 5 shown in various stages of operation.
Figure 6B:
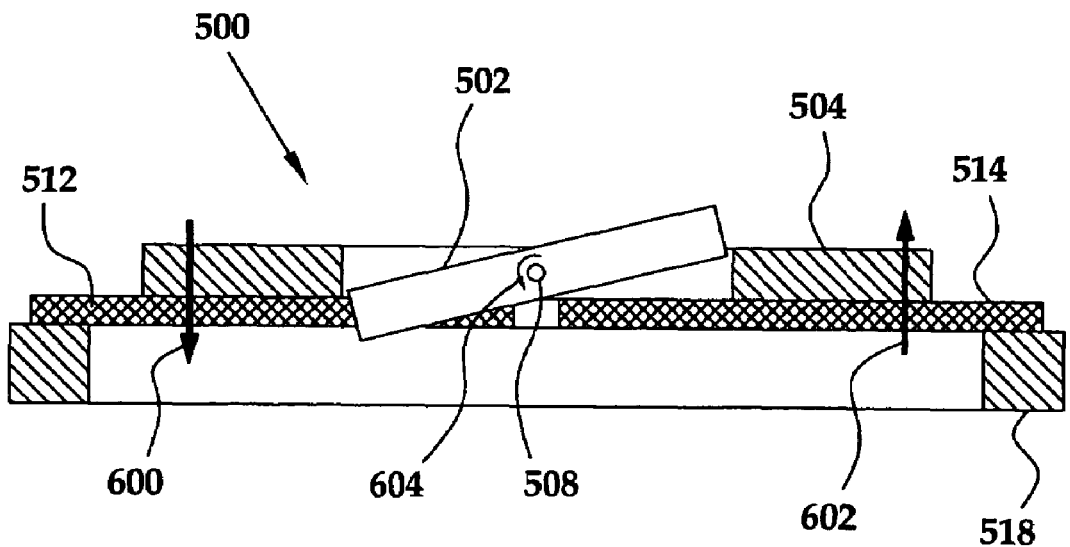

Turning now to FIGS. 6A and 6B, a cross sectional end view of the mirror 500 is illustrated in various modes of operation. In FIG. 6A, the piezoelectric elements have been energized in pairs 510, 512: 514, 516 to apply forces in the directions indicated by the arrows 600, 602. The forces 600, 602 are applied to the base region 504 and are then transmitted to the movable reflective region 502 via the split hinges 506. The force applied through the split hinges 506 causes the movable reflective region 502 to rotate in a first direction, as indicated by the arrow 604. By controlling the amount of force applied by the piezoelectric elements 510, 512, 514, 516 the amount of rotation may be accurately controlled. Those skilled in the art will appreciate that the amount of force delivered by the piezoelectric elements 510, 512, 514, 516 may be controlled by varying electrical parameters of a signal applied to the piezoelectric elements 510, 512, 514, 516. For example, the amount of force generated by the piezoelectric elements 510, 512, 514, 516 may be controlled by varying the voltage, current, frequency, duty cycle, or a combination thereof. Additionally, it may be useful in some applications to apply unequal force through the various piezoelectric elements 510, 512, 514, 516.

In FIG. 6B, the piezoelectric elements have been energized in pairs 510, 512: 514, 516 in a manner to apply forces in the directions indicated by the arrows 600, 602, which are opposite to the forces shown in FIG. 6A. Nevertheless, the forces 600, 602 are applied to the base region 504 and are then transmitted to the movable reflective region 502 via the split hinges 506. The force applied through the split hinges 506 causes the movable reflective region 502 to rotate in a second direction, as indicated by the arrow 604. By controlling the amount of force applied by the piezoelectric elements 510, 512, 514, 516 the amount of rotation may be accurately controlled. Those skilled in the art will appreciate that the amount of force delivered by the piezoelectric elements 510, 512, 514, 516 may be controlled by varying electrical parameters of a signal applied to the piezoelectric elements 510, 512, 514, 516. For example, the amount of force generated by the piezoelectric elements 510, 512, 514, 516 may be controlled by varying the voltage, current, frequency, duty cycle, or a combination thereof. Additionally, it may be useful in some applications to apply unequal force through the various piezoelectric elements 510, 512, 514, 516.

Further, in some applications the degree of rotation may be controlled by first energizing a first pair 510, 512 of the piezoelectric elements for a first range of rotation, and then energizing the second pair 514, 516 oppositely, and at the same time, to produce a second, greater range of rotation. That is, energizing the first pair 510, 512 may be useful to produce rotation in a range of 0-2°, whereas energizing both pairs 510, 512; 514, 516 oppositely and simultaneously may produce rotation in a range of 2-5°. Those skilled in the art will appreciate that varying energization schemes of the piezoelectric elements 510, 512, 514, 516 to produce various desirable rotational movement of the movable reflective region 502 may be employed without departing from the spirit and scope of the instant invention.

Figure 7A:
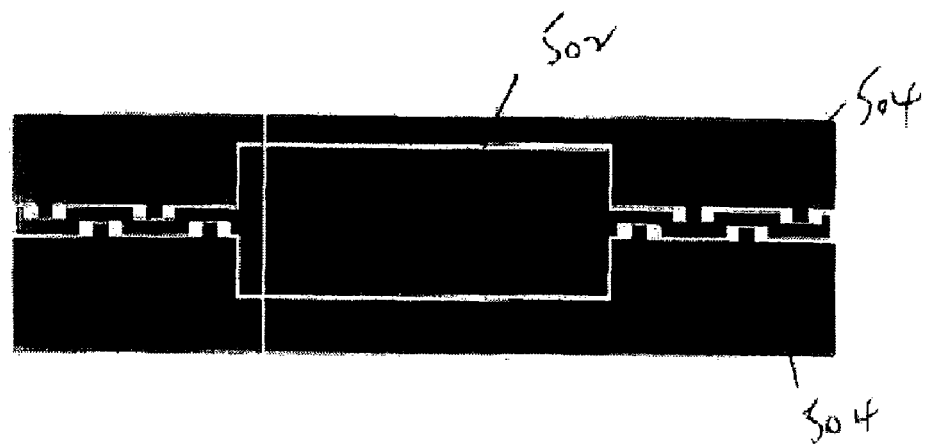
FIGS. 7A and 7B depict a top view and an enlarged top view of an alternative embodiment of the mirror shown in FIG. 1.
Figure 7B:
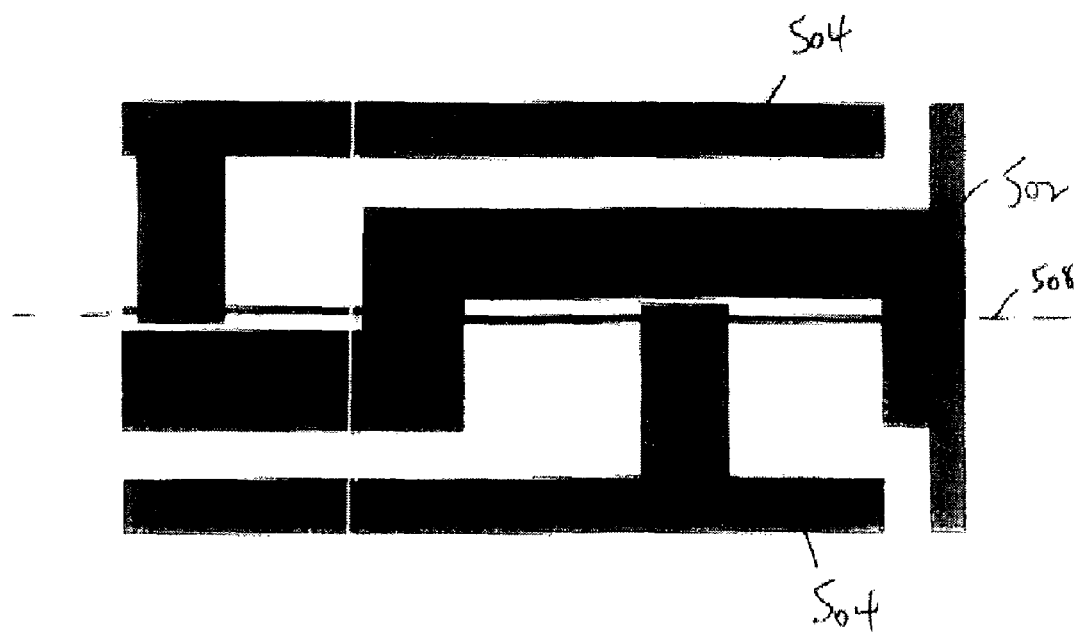
Figure 8:
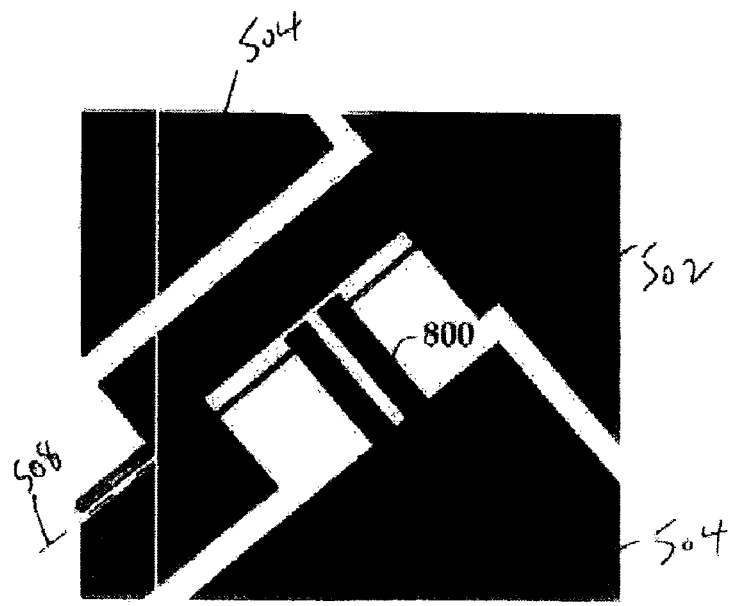
FIG. 8 depicts a top view of another alternative embodiment of the mirror shown in FIG. 1 with forked push pads.
Figure 9:
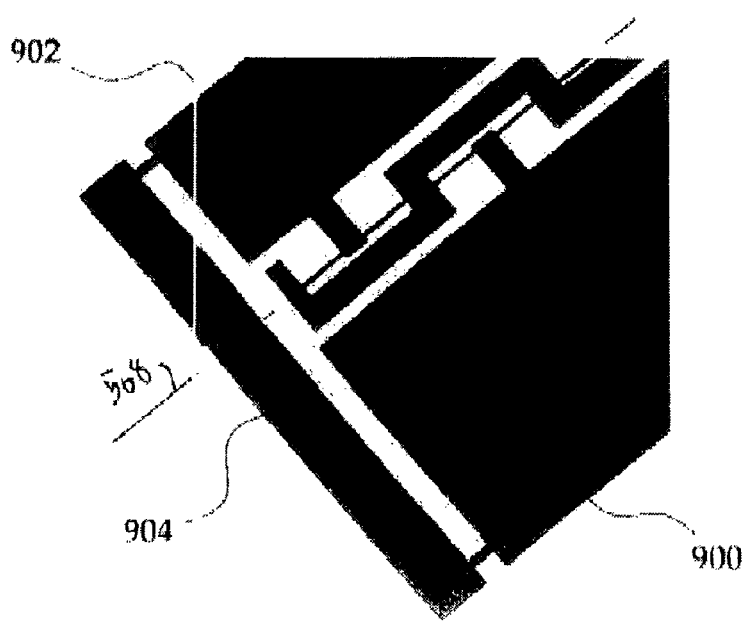
FIG. 9 depicts a top view of another alternative embodiment of the mirror shown in FIG. 1 with mounting bridges.

Turning now to FIGS. 7-9, alternative embodiments of the construction of the mirror 500 are shown. In particular, FIGS. 7-9 illustrate variations in the formation of the split hinges 506. FIGS. 7A and 7B illustrate a top view and an expanded top view of the mirror 500 having a plurality of hinges with offset. While the embodiment illustrated in FIG. 7 shows two pairs of split hinges on each side of the mirror, those skilled in the art will appreciate that any number of hinge pairs with offset can be used. Further, the offset can have any value, starting from 0 and up to and, possibly, exceeding hinge width (FIG. 7 shows offset roughly equal to hinge width).

As shown in FIG. 8, push-pads 800, also known as pad portions, which are used to attach the hinges, can be forked to allow some compliance or flexibility in the direction of hinge length and thus compensate for hinge stretching due to its twisting.

Additionally, as shown in FIG. 9, push pads 900, 902 located on both sides of the hinges may be connected by bridges 904 to facilitate mirror handling and mounting. After the mirror is mounted, the bridges 904 may be either removed, or kept if they are sufficiently thin not to create substantial resistance.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A light scanning arrangement, comprising:
   a) a scan element oscillatable about an axis, and operative for reflecting light incident thereon;
   b) a movable support having support portions at opposite sides of the axis;
   c) a pair of torsion hinges spaced apart along the axis and connected between the movable support and the scan element for supporting the scan element for oscillation about the axis, each torsion hinge having a first hinge portion extending linearly generally parallel to the axis at one side thereof, a second hinge portion extending linearly generally parallel to the axis at an opposite side thereof, and an offset portion extending linearly across the axis and connecting the first and second hinge portions; and
   d) a drive for directly moving the support portions and, in turn, for indirectly oscillating the scan element about the axis to scan the incident light.

2. The arrangement of claim 1, wherein the scan element, the movable support and the torsion hinges are a one-piece, generally planar substrate.

3. The arrangement of claim 1, wherein the movable support is a frame surrounding the scan element and lying in a common plane therewith in a rest position of the scan element.

4. The arrangement of claim 1, wherein two of the support portions are provided for each torsion hinge; wherein the drive directly moves the two support portions for each torsion hinge in one circumferential direction about the axis during a part of a drive cycle, and directly moves the two support portions for each torsion hinge in an opposite circumferential direction about the axis during a remaining part of the drive cycle; and wherein the scan element is driven in a non-resonant mode in both of the circumferential directions.

5. The arrangement of claim 4, wherein the drive includes a pair of piezoelectric devices for each torsion hinge, each piezoelectric device being connected to a respective support portion and being movable along a stroke in response to a periodic electrical drive signal.

6. The arrangement of claim 5, wherein the movable support is a planar substrate, and wherein the piezoelectric devices lie in a plane parallel to the substrate.

7. The arrangement of claim 5, wherein the piezoelectric devices are elongated and extend toward, but terminate short of, the axis.

* * * * *